USOO5639723A

United States Patent [19]
Kroner et al.

[11] Patent Number: 5,639,723
[45] Date of Patent: Jun. 17, 1997

[54] REACTION PRODUCTS OF POLYBASIC CARBOXYLIC ACIDS AND AMINO-CONTAINING COMPOUNDS, THEIR PREPARATION AND THEIR USE IN DETERGENTS AND CLEANING AGENTS

[75] Inventors: Matthias Kroner, Eisenberg; Heinrich Hartmann; Dieter Boeckh, both of Limburgerhof; Richard Baur, Mutterstadt; Alexander Kud, Eppelsheim; Volker Schwendemann, Neustadt, all of Germany

[73] Assignee: BASF Aktiengesellschaft, Ludwigshafen, Germany

[21] Appl. No.: 367,322

[22] PCT Filed: Jul. 17, 1993

[86] PCT No.: PCT/EP93/01893

§ 371 Date: Jan. 23, 1995

§ 102(e) Date: Jan. 23, 1995

[87] PCT Pub. No.: WO94/03576

PCT Pub. Date: Feb. 17, 1994

[30] Foreign Application Priority Data

Aug. 3, 1992 [DE] Germany .................. 42 25 620.08

[51] Int. Cl.$^6$ .................. C11D 3/37; C11D 3/20; C08G 69/00; C08G 73/00
[52] U.S. Cl. .................. 510/476; 510/361; 510/499; 525/420; 525/432; 528/328; 528/329.1; 528/342; 528/363
[58] Field of Search .................. 252/174.23, 174.19, 252/544, 546, 153, DIG. 2; 528/328, 329.1, 342, 363; 525/432, 420; 510/476, 499, 361

[56] References Cited

U.S. PATENT DOCUMENTS

| | | | |
|---|---|---|---|
| 2,153,801 | 4/1939 | Hovey et al. | 528/363 |
| 2,757,125 | 7/1956 | Mudvak | 167/93 |
| 3,645,954 | 2/1972 | Tevade | 260/29.2 |
| 3,904,359 | 9/1975 | Ramachandran . | |
| 3,998,761 | 12/1976 | Gary et al. | 252/544 |
| 4,021,377 | 5/1977 | Borchert et al. | 252/546 |
| 4,235,811 | 11/1980 | Schulze et al. | 260/513 N |
| 4,298,708 | 11/1981 | Schulze et al. | 521/115 |
| 4,304,690 | 12/1981 | Schulze et al. | 252/526 |
| 4,433,113 | 2/1984 | Woodward et al. | 525/327.5 |
| 4,797,481 | 1/1989 | Garlizi et al. | 536/116 |
| 4,822,886 | 4/1989 | Donovan . | |
| 4,828,722 | 5/1989 | Steltenkamp | 252/8.8 |
| 5,093,040 | 3/1992 | Donovan . | |
| 5,322,635 | 6/1994 | Hieatt et al. | 252/82 |
| 5,371,179 | 12/1994 | Paik et al. | 528/363 |
| 5,408,028 | 4/1995 | Wood et al. | 528/328 |
| 5,451,335 | 9/1995 | Hieatt et al. | 252/82 |

FOREIGN PATENT DOCUMENTS

| | | |
|---|---|---|
| 0 578 451 | 1/1994 | European Pat. Off. . |
| 2502143 | 3/1982 | France . |
| 1 769 923 | 8/1968 | Germany . |

*Primary Examiner*—Ardith Hertzog
*Attorney, Agent, or Firm*—Oblon, Spivak, McClelland, Maier & Neustadt, P.C.

[57] ABSTRACT

Reaction products of polybasic acids and amino-containing compounds, which are obtainable by heating a mixture of (a) a polybasic carboxylic acid selected from the group consisting of citric acid, isocitric acid, aconitic acid, itaconic acid and/or tartaric acid and (b) an amino-containing compound in a molar ratio of (a) to (b) of from 1:0.1 to 1:10 to at least 80° C. are used as additives in low-phosphate and phosphate-free detergents and cleaning agents.

7 Claims, No Drawings

REACTION PRODUCTS OF POLYBASIC CARBOXYLIC ACIDS AND AMINO-CONTAINING COMPOUNDS, THEIR PREPARATION AND THEIR USE IN DETERGENTS AND CLEANING AGENTS

The present invention relates to reaction products of polybasic carboxylic acids and amino-containing compounds, which are obtainable by heating the mixture of (a) a polybasic carboxylic acid and (b) an amino-containing compound to at least 80° C., processes for the preparation of the reaction products and the use of the reaction products as additives in low-phosphate and phosphate-free detergents and cleaning agents.

Polycondensates which contain aspartic acid as repeating units in condensed form are obtained by the thermal treatment of ammonium salts of fumaric acid, maleic acid or malic acid (cf. Ann. 75 (1850), 294 and Comp. Rend. 30 (1850), 324). Makromol. Chem., Makromol. Symp. 47 (1991), 345–355 discloses that the reaction of aldehydes with citric acid gives oxolactones, which are converted into the acyl dichlorides and subjected to polycondensation with benzyl ester of lysine to give polyamides. The benzyl esters in the aldehyde component are chemically bonded in the polyamide formed.

In U.S. Pat. No. 4,822,886, defined 5- and 6-membered N-hydroximides are used as novel complexing agents for iron(III) for detergents and cleaning agents, which can be prepared from citrates and hydroxylamine. Inevitably, these cyclic hydroximides form only when partially or completely esterified citric acid is used as a starting material. The reaction is carried out at room temperature. According to U.S. Pat. No. 5,093,040, the reaction products of dimethyl maleate and hexamethylenediamine are prepared at 70° C. and further reacted with maleic anhydride and then with hydroxylamine. N-Hydroximide compounds and hydroxamic acids are formed. The reaction products are used in detergents.

U.S. Pat. No. 3,904,359 discloses treating textile materials post-wash with an aqueous solution of N-tallow-propylenediamine and citric acid at about 49° C.

It is an object of the present invention to provide novel substances which are suitable for use in detergents and cleaning agents.

We have found that this object is achieved, according to the invention, by polymeric reaction products of polybasic carboxylic acids and amino-containing compounds, which are obtainable by heating a mixture of (a) citric acid, isocitric acid, aconitic acid, itaconic acid and/or tartaric acid and (b) an amino-containing compound of the group (b) ammonia, ammonium salts, alkylamines, amino acids, amino sugars, polyamines, aminonitriles, hydrazine, hydroxylamine and/or polyvinylamines to at least 120° C. in a molar ratio of (a) to (b) of from 1:0.1 to 1:10.

The present invention furthermore relates to a process for the preparation of the reaction products, wherein a mixture of (a) citric acid, isocitric acid, aconitic acid, itaconic acid and/or tartaric acid or the salts obtainable therefrom by partial or complete neutralization with alkali metal or alkaline earth metal base with (b) an amino-containing compound of the group (b) ammonia, ammonium salts, alkylamines, amino acids, amino sugars, polyamines, aminonitriles, hydrazine, hydroxylamine and/or polyvinylamines in a molar ratio of (a) to (b) of from 1:0.1 to 1:10 is heated to at least 120° C. Preferably used compounds of group (b) are ammonia, ammonium salts, alkylamines, amino acids, amino sugars, polyamines, aminonitriles, hydrazine, hydroxylamine and/or polyvinylamines.

The resulting polymeric and nonpolymeric reaction products are used as additives in low-phosphate and phosphate-free detergents and cleaning agents.

The mixtures which are reacted solely by heating contain, as component (a), citric acid, isocitric acid, aconitic acid, itaconic acid, tartaric acid or a mixture of the stated carboxylic acids. The stated carboxylic acids may be present in a form partially or completely neutralized with an alkali metal or alkaline earth metal base. Sodium hydroxide solution, potassium hydroxide solution, sodium bicarbonate, potassium bicarbonate, sodium carbonate, potassium carbonate, calcium oxide, magnesium oxide, barium oxide or calcium hydroxide is preferably used as the base for neutralizing the carboxylic acid. If the stated carboxylic acids are partially neutralized, the degree of neutralization is from 0 to 70%. Citric acid is preferably used as a compound of component (a).

The starting materials of component (b) are amino-containing compounds which may be used in the form of the free bases or in partially or completely neutralized form. These compounds preferably contain primary and/or secondary amino groups. The compounds of component (b) may carry one or more amino groups. Examples of suitable compounds of this group are ammonia, $C_1$–$C_{30}$-alkylamines, such as methylamine, ethylamine, ethanolamine, butylamine, dibutylamine, hexylamine, diethanolamine, dimethylamine, diethylamine, diisopropylamine, stearylamine, coconut fatty amine, palmitylamine and oleylamine. Ammonia and amines may also be used in the condensation in the form of their salts. The use of carbonic acid derivatives of ammonia, which can be prepared, for example, by reaction of ammonia and carbon dioxide, eg., ammonium carbonate, ammonium bicarbonate, ammonium carbonate and urea, is preferred.

Other suitable compounds of component (b) are amino acids, of which the following are examples: glycine, alanine, valine, leucine, phenylalanine, aspartic acid, asparagine, glutamine, glutamic acid, sarcosine, taurine, lysine, methionine, cysteine, cystine, aminovaleric acid, aminoundecanoic acid, iminodiacetic acid and mixtures with two or more of the stated or other amino acids. In the group consisting of the amino acids, glycine, aspartic acid, asparagine, glutamine, lysine and/or iminodiacetic acid are preferably used.

Suitable amino sugars are, for example, chitosan or chitosamine. This group of compounds also includes products, such as aminosorbitol, N-methylaminosorbitol and aminodisorbitol, which are obtainable by reductive amination of the reducing carbohydrates.

Other suitable components (b) are polyamines. In the present application, the term polyamines also includes the amines, such as ethylenediamine, tetramethylenediamine, hexamethylenediamine and piperazine, and polyalkylenepolyamines, for example polyethyleneamines, such as diethylenetriamine, triethylenetetramine and tetraethylenepentamine, up to polyethyleneamines having molecular weights of 100,000. Other suitable compounds of the group (b) are polyvinylamines. These are to be understood as being both homopolymers of vinylamine and copolymers containing vinylamine units, for example the polymers formed by acidic or alkaline hydrolysis of copolymers of N-vinylformamide and vinyl acetate containing vinylamine and vinyl alcohol units in addition to still unhydrolyzed N-vinylformamide and vinyl acetate units as polymerized units.

Other suitable amines are aminonitriles which are formed by an addition reaction of both ammonia and hydrocyanic acid with aldehyde. Hydrazine is also suitable.

Mixtures of compounds of group (b) can of course also be used. Examples of such mixtures are mixtures of ammonia and aspartic acid, mixtures of ammonia and glutamic acid, mixtures of aspartic acid and glutamic acid, mixtures of glycine and aspartic acid and mixtures of glycine and ammonia. The amino acids may also be produced as intermediates in the reaction mixture, for example by reacting maleic acid with ammonia or fumaric acid with ammonia or malic acid with ammonia to give DL-aspartic acid.

The compounds of components (a) and (b) in a molar ratio of (a) to (b) of from 1:0.1 to 1:10, preferably from 1:0.5 to 1:3 are converted into polymeric and nonpolymeric reaction products by thermal treatment at 80° C. or higher, preferably from 120° to 240° C. Mixtures of products may form in the thermal treatment. Polymeric and nonpolymeric reaction products are formed when the reactants are heated in the dry state, ie. in the absence of water, whereas nonpolymeric reaction products are formed on heating in aqueous solution. The amino-containing compounds of component (b) may be bound by an amine-like or amide-like bond to citric acid, isocitric acid, aconitic acid, itaconic acid or tartaric acid or decomposition products thereof. For the preparation of the reaction products, for example, it is also possible to subject citric acid, isocitric acid or aconitic acid to a thermal treatment beforehand at from 100° to 350° C. and then to react them with amines. For example, a pyrolysis of the calcium salt of citric acid, isocitric acid or aconitic acid according to GB-A 1 082 179, with formation of biodegradable pyrolysis products containing more than 3 carboxyl groups in the molecule, can first be carried out, and the polybasic carboxylic acids then reacted with amines, preferably ammonia or amino acids.

For example, it is possible to prepare reaction mixtures which contain α- or β-aminotricarballylic acid by reacting citric acid, isocitric acid or aconitic acid. If the reaction is carried out with an alkylamine instead of with ammonia, N-alkylaminotricarballylic acids can be obtained. In the reaction of citric acid, isocitric acid or aconitic acid with amino acids, carboxyl-containing N-substituted aminotricarballylic acid may be formed.

The thermal treatment of the reaction components (a) and (b) can be carried out by heating the salts of the polybasic carboxylic acids of group (a) or their pyrolysis products with amines of group (b) in the dry state to at least 80° C. The thermal treatment can be carried out in the presence of air, under inert gas, for example nitrogen, with superheated steam or under reduced pressure, for example from 50 to 200 mbar. The reaction time depends on the temperature at which the thermal treatment is carried out. Higher temperatures require shorter residence times of the reaction mixtures. The reaction time is from about 10 minutes to about 50 hours. The polymeric reaction products may be defined oligomeric or polymeric compounds. Under suitable reaction conditions, the number average molecular weights may be up to 30,000. In most cases, polymeric reaction products which have number average molecular weights of up to 15,000 are obtained. For example, polymeric reaction products having molecular weights of up to 3,000 can be obtained in addition to low molecular weight reaction products if a salt of 1 mol of ammonia and 1 mol of sodium citrate is heated for 6 hours at 220° C. in the dry state. By heating a salt of 1 mol of aconitic acid and 1 mol of ammonia at 160° C., polymeric reaction products having number average molecular weights of up to 5,000 are obtained, for example, in addition to low molecular weight reaction products.

Polymeric reaction products are preferably formed when a mixture of a polybasic carboxylic acid and an amine is prepared and is then subjected to polycondensation without the use of water as a diluent, ie. by heating in the dry state. Temperatures are preferably from 120° to 260° C. In the case of the polycondensation, catalysts, for example phosphoric acid or other mineral acids or carboxylic acids or sulfonic acids, may be present. Where acidic catalysts are used, some or all of the amino groups of the compounds of component (b) may be neutralized. The condensation may also be carried out in superstoichiometry, based on the amino groups of component (b), of acids. For example, the condensation can be carried out in phosphoric acid as a reaction medium, and the molar ratio of amino groups in the compounds of component (b) to phosphoric acid may be from 1:1.5 to 1:10. The acids used as a catalyst are separated from the polymer after the condensation. In a preferred embodiment of the invention, (a) aconitic acid and/or itaconic acid are condensed with
(b) ammonia and/or amines by heating to 120°–260° C. to give polymeric reaction products. The number average molecular weights of the condensates thus obtainable are, for example, from 700 to 30,000.

Heating in the dry state may also be prematurely interrupted so that the reaction mixtures contain the polymeric reaction products in addition to low molecular weight, nonpolymeric reaction products and unconverted polybasic carboxylic acids and amines.

Nonpolymeric reaction products may also be formed when components a) and b) are heated in the dry state. They can also be obtained when a solution of components a) and b) are prepared as 10–70% strength solution in water (or a mixture of organic solvents with water) and these aqueous solutions are heated to 80°–200° C. If aqueous solutions are heated to above 100° C., this is carried out in apparatuses having a pressure-tight seal. By increasing the temperature to above 100° C., the reaction rate can be considerably increased. For example, the same conversion is obtained if a 50% strength aqueous solution of 1 mol of citric acid and 1 mol of ammonia is kept for 60 hours at 100° C. or for 7 hours at 140° C.

The thermal treatment of mixtures of (a) and (b) can also be carried out in a solvent by dissolving the components (a) and (b). The reaction may furthermore be effected in an inert diluent in which the reactants (a) and (b) and the reaction products are only partly soluble, if at all. Examples of suitable solvents and diluents are the following substances: water, nonionic surfactants, glycerol, polyethylene glycols having molecular weights of up to 1,000, toluene, xylene, tetralin, hydrocarbons, liquid paraffins, vegetable oils, dimethylformamide, dimethyl sulfoxide and N-methylpyrrolidone.

Water is preferably used as a solvent. It is also possible to use liquid ammonia as a reactant and a solvent.

For example, the reaction products can be prepared by first preparing a clear aqueous solution of 1 mol of ammonia and 1 mol of citric acid and refluxing this solution for 57 hours. However, this solution can also be evaporated to dryness and the dry residue heated at 220° C. for 6 hours.

The thermal treatment of the reactants (a) and (b) is preferably carried out in water at above 100° C. In these cases, it is of course necessary to carry out the reaction in pressure-resistant reactors. In this process variant, nonpolymeric reaction products of citric acid, isocitric acid, aconitic acid or the pyrolysis products of these acids with from 0.1 to 10, preferably from 1 to 3, mol of ammonia or amino acids per mol of the particular acids used are preferably prepared and are heated for from 10 minutes to 60 hours at from 100° to 220° C., preferably from 110° to 200° C. The solids concentration in the aqueous solution of the reactants (a) and (b) is from 5 to 80, preferably 10 to 70, % by weight.

In another process variant, amines can first be added to an aqueous solution of one of the suitable tricarboxylic acids or its pyrolysis products, water-insoluble organic solvent can be added to the resulting solution of the salts and the salts can be dewatered azeotropically. The reactions with the amines can take place during this procedure. The salts can then be further thermally treated as a suspension in the organic solvents at the desired temperature. However, the reaction can also be carried out in the form of a water-in-oil emulsion by not removing the water and stabilizing the emulsion by adding protective colloids and/or surfactants.

The reaction of the components (a) and (b) can be carried out at a pH of from 1 to 14. The pH of the reaction mixture is essentially determined by the ratio of carboxyl to amine. The pH of the reaction mixture can be reduced by adding acetic acid, hydrochloric acid, sulfuric acid or weak or strong acids also in the form of amine salts, for example ammonium acetate or ammonium chloride, and can also be increased by adding alkali metal or alkaline earth metal hydroxides or the corresponding carbonates or bicarbonates. For example, sodium hydroxide solution, potassium hydroxide solution, calcium hydroxide, potassium bicarbonate or potassium carbonate is used to increase the pH.

Polymeric and nonpolymeric reaction products are obtained, for example, if the following mixtures of components (a) and (b) in from 10 to 70% strength aqueous solution are reacted in an autoclave at from 150° C. or by heating to 200° C., in the dry state, the mixtures obtained by evaporating down the aqueous solutions:

1 mol of citric acid and 1 mol of ammonia
1 mol of citric acid and 2 mol of ammonia
1 mol of citric acid and 3 mol of ammonia
1 mol of citric acid, 1 mol of ammonia and 1 mol of ammonium chloride
1 mol of citric acid, 1 mol of ammonia and 1 mol of ammonium acetate
1 mol of citric acid and 1 mol of ammonium acetate
1 mol of citric acid, 1 mol of ammonia and 1 mol of sodium hydroxide solution
1 mol of citric acid, 2 mol of ammonia and 1 mol of sodium hydroxide solution
1 mol of citric acid, 3 mol of ammonia and 1 mol of sodium hydroxide solution
1 mol of citric acid, 1 mol of ammonia and 2 mol of sodium hydroxide solution
1 mol of citric acid and 1 mol of ammonium chloride
1 mol of aconitic acid and 1 mol of ammonia
1 mol of aconitic acid and 2 mol of ammonium chloride
1 mol of aconitic acid and 3 mol of ammonium phosphate
1 mol of citric acid and 1 mol of aspartic acid
1 mol of citric acid and 1 mol of glycine
1 mol of citric acid and 2 mol of glutamic acid
2 mol of citric acid, 1 mol of ammonia and 1 mol of aspartic acid
1 mol of aconitic acid and 0.5 mol of ammonia
1 mol of isocitric acid and 0.1 mol of glycine
1 mol of aconitic acid and 3 mol of aspartic acid
1 mol of aconitic acid and 0.5 mol of ammonium carbonate
1 mol of aconitic acid and 1 mol of ammonium bicarbonate
1 mol of itaconic acid and 0.5 mol of ammonium carbonate
1 mol of itaconic acid and 1 mol of ammonium bicarbonate
1 mol of itaconic acid and 0.5 mol of ammonium carbamate
1 mol of aconitic acid and 0.5 mol of ammonium carbamate
1 mol of aconitic acid and 0.5 mol of urea
1 mol of itaconic acid and 0.5 mol of urea
1 mol of tartaric acid and 1 mol of ammonia
1 mol of citric acid and 1 mol of chitosan
8 mol of citric acid and 1 mol of chitosan
3 mol of citric acid and 1 mol of chitosan
4 mol of citric acid and 1 mol of chitosamine.

If the reaction does not go to completion, the reaction products of components (a) and (b) can be isolated from the reaction mixture with the aid of conventional purification operations. The condensation reactions described above can also be carried out at from 230° to 260° C.

The nonpolymeric reaction products obtained may be product mixtures in the form of aqueous solutions. The individual components can be isolated or concentrated. All conventional methods can be used, for example fractional crystallization, chromatography or precipitation as sparingly soluble salts. The reaction products may have a zwitterionic character, ie. they contain amino and carboxyl groups. The solubility of these reaction products is dependent on the pH and the charged state. Aminocarboxylic acids are preferably crystallized at the isoelectric point. The salts of the reaction products can be precipitated by adding alkaline earth metal or heavy metal salts. Examples are calcium, magnesium, barium, iron, silver and copper salts. Purification operations can also be carried out by means of ion exchangers.

The reactions and purification steps can be monitored analytically by HPLC chromatography. For example, a commerical RP18 column with 0.1N aqueous phosphoric acid as the eluent and a UV detector can be used. The polybasic carboxylic acid used may be employed as the internal standard. The retention times are then based on this standard.

If the starting materials used do not present problems during the use of the polymeric reaction products, they may remain in the reaction mixture.

The polymeric reaction products of components (a) and (b), which products are described above, are used as additives in low-phosphate and phosphate-free detergents and cleaning agents. Low-phosphate detergents are understood as meaning detergent formulations which contain no more than 25% by weight, calculated as sodium triphosphate, of phosphate.

The composition of the detergent and cleaning agent formulations may be very different. Detergent and cleaning agent formulations usually contain from 2 to 50% by weight of surfactants and, if required, builders. This data applies both to liquid and to powder detergent and cleaning agent formulations. Examples of the composition of detergent formulations which are commonly used in Europe, the USA and Japan are presented in the form of a Table in, for example, Chemical and Engn. News 67 (1989), 35. Further information on the composition of detergents and cleaning agents appears in WO-A-90/13581 and Ullmanns Encyclopädie der technischen Chemie, Verlag Chemie, Weinheim 1983, 4th Edition, pages 63–160.

The detergents can, if required, also contain a bleach, for example sodium perborate, which, when used, may be present in amounts of up to 30% by weight in the detergent formulation. The detergents and cleaning agents can, if required, contain further conventional additives, for example complexing agents, turbidity agents, optical brighteners, enzymes, perfume oils, dye transfer inhibitors, antiredeposition agents and/or bleach activators. The polymeric reaction products are present in the detergents and cleaning agents in amounts of from 0.1 to 20% by weight.

In the Examples which follow, percentages are by weight. The analytical investigation of the reaction mixtures was carried out with the aid of conventional liquid phase chromatography (HPLC). The column used was a commercial RP18 column, and the eluent was 0.2 mol of phosphoric acid. Unconverted citric acid with a retention time of 3.32 minutes was used as the internal standard for the stated retention times. Detection was carried out with the aid of a UV spectrometer at a wavelength of 210 nm.

EXAMPLE 1

210 g (1 mol) of citric acid monohydrate were dissolved in 100 ml of water at 50° C. in a beaker, and 68 g (1 mol) of 25% strength aqueous ammonia solution were added. The solution was then introduced into a 1 l autoclave, the autoclave was closed and the solution was then heated for 7 hours at 140° C. A solution which contained about 50% of unconverted citric acid in addition to reaction products detectable in the HPLC diagram at 2.01 and 2.14 minutes (together 50%) was obtained. The pH of the solution was brought to 7 for testing the performance characteristics.

EXAMPLE 2

A solution of 210 g (1 mol) of citric acid monohydrate in 100 g of water was mixed with 204 g (3 mol) of a 25% strength aqueous ammonia solution, and the mixture was heated for 7 hours at 140° C. in an autoclave. The HPLC analysis indicated about 30% of citric acid in the reaction mixture and a reaction product at 1.98 minutes (10%) and one at 6.3 minutes (60%). The pH of the solution was brought to 7.

EXAMPLES 3, 4 AND 5

(Polymers of ammonia and aconitic acid, citric acid and itaconic acid)

1 mol of the polybasic carboxylic acid stated in Table 1 was dissolved in 800 ml of water, and 1 mol of 25% strength aqueous ammonia solution was added. The solution was evaporated to dryness under reduced pressure, and the powder residue was heated for 4 hours at the temperature stated in Table 1. To determine the molecular weight, a sample was neutralized to pH 7 with sodium hydroxide solution and characterised by GPC (sodium polyacrylates as standard). The molecular weights determined are listed in Table 1.

TABLE 1

| Example No. | Polybasic carboxylic acid | Temperature (°C.) | Molecular weight Number average | Molecular weight Weight average | Highest molecular weight up to |
|---|---|---|---|---|---|
| 3 | Sodium citrate | 220 | 1270 | 1310 | 3000 |
| 4 | Aconitic acid | 160 | 1400 | 1500 | 4500 |
| 5 | Itaconic acid | 135 | 1340 | 1410 | 4500 |

EXAMPLES 6 AND 7

A solution of 1 mol of citric acid and 1 mol of aqueous 25% strength ammonia was evaporated to dryness, and the residue was heated to the temperature stated in Table 2. After cooling, the sample was dissolved in water, brought to pH 7 with sodium hydroxide solution and analyzed by HPLC.

TABLE 2

| Example No. | Carboxylic acid | Temperature (°C.) | Time (hours) | GPC Retention time, proportion |
|---|---|---|---|---|
| 6 | Citric acid | 120 | 6 | 1.9 min (2%) |
| 7 | Citric acid | 105 | 17 | 2.0 min (5%) |
| | | | | 2.2 min (40%) |
| | | | | 3.6 min citric acid (53%) |

Testing the performance characteristics of the polymeric reaction products
CD test (Clay dispersing)

Finely milled china clay SPS 151 is used as a model for particulate dirt. 1 g of clay is thoroughly dispersed in 98 ml of water for 10 minutes in a 100 ml glass cylinder with the addition of 1 ml of a 0.1% strength sodium salt solution of the polyelectrolyte. Immediately after stirring, a 2.5 ml sample is taken from the centre of the glass cylinder and is diluted to 25 ml, after which the turbidity of the dispersion is determined using a turbidimeter. After the dispersion has been standing for 30 and 60 minutes, samples are again taken and the turbidity is determined as above. The turbidity is expressed in NTU (nephelometric turbidity units). The less the dispersion settles out during storage, the higher are the measured turbidity values and the more stable is the dispersion. The dispersion constant, which describes the behavior of the sedimentation process as a function of time, is determined as a second physical parameter. Since the sedimentation process can be approximately described by a monoexponential time law, $\tau$ is the time in which the turbidity decreases to 1/eth of the initial state at time t=0.

The higher the value of $\tau$, the more slowly does the dispersion settle out.
Calcium carbonate dispersing capacity (CCDC)

The calcium carbonate dispersing capacity was determined by dissolving 1 g of the copolymer in 100 ml of distilled water, neutralizing it if required by adding 1M sodium hydroxide solution, and introducing 10 ml of 10% strength sodium carbonate solution. The solution was then titrated at constant pH and constant temperature with 0.25M calcium acetate solution until turbidity occurs. The pH is obtained by adding either dilute sodium hydroxide or hydrochloric acid solution. The dispersing capacity was determined at 20° C. and pH 11. The results are shown in Table 3.

TABLE 3

| Example | Reaction product according to Example | τ (min) | Efficiency (%) | CCDC [mg/g] |
|---|---|---|---|---|
| 8 | 1 | 341 | 93.6 | 135 |
| 9 | 2 | 314 | 92.6 | 130 |
| 10 | 3 | 358.4 | 92.6 | — |
| 11 | 4 | 177.6 | 88.2 | 50 |
| 12 | 5 | 202.2 | 79.3 | — |
| 13 | 6 | 150 | 89.8 | 85 |
| 14 | 7 | 271 | 88.7 | 80 |
| Comp. Example | | | | |
| 1 | Sodium aconitate | 155 | 78.8 | 25 |
| 2 | Polyacrylate (Molecular weight 5000) | 345 | 100 | 80 |
| 3 | Itaconate | 50.7 | 20 | 20 |

Table 3 shows that the clay dispersing properties of aconitic and itaconic acid can be improved by the reactions.

The novel reaction products are biodegradable. Products having high CCDC values can be used as incrustation inhibitors in detergents.

We claim:

1. A polymeric reaction product of a polybasic carboxylic acid and an amino-containing compound, which is prepared by heating a mixture of:
   (a) a compound selected from the group consisting of citric acid, isocitric acid, tartaric acid, the partially or completely neutralized alkali metal or alkaline earth metal salts of citric acid, isocitric acid, tartaric acid and mixtures thereof; and
   (b) an amino group containing compound selected from the group consisting of ammonia, ammonium carbonate, ammonium bicarbonate, an amino acid selected from the group consisting of glycine, alanine, valine, leucine, phenylalanine, asparagine, glutamine, glutamic acid, sarcosine, taurine, lysine, methionine, cysteine, cystine, aminovaleric acid, aminoundecanoic acid, iminodiacetic acid, amino sugars and mixtures thereof; to at least 120° C. in a molar ratio of (a) to (b) of from 1:0.1 to 1:10.

2. The polymeric reaction product of claim 1, wherein said molar ratio of (a) to (b) ranges from 1:0.5 to 1:3.

3. The polymeric reaction product of claim 1, wherein said amino sugar is a compound selected from the group consisting of aminosorbitol, N-methylaminosorbitol and aminodisorbitol.

4. The polymeric reaction product as claimed in claim 1, wherein (a) citric acid is condensed with (b) ammonia or an ammonium salt by heating the mixture of (a) and (b) at a temperature of 120°–260° C.

5. A low phosphate or phosphate-free detergent or cleaning agent, comprising:

as an additive, the polymeric reaction product as claimed in claim 1.

6. A process for the preparation of a polymeric reaction product, comprising:

heating a mixture of (a) citric acid, isocitric acid, tartaric acid, the partially or completely neutralized alkali metal or alkaline earth metal salts of citric acid, isocitric acid, tartaric acid and mixtures thereof; and (b) an amino-group containing compound selected from the group consisting of ammonia, ammonium carbonate, ammonium bicarbonate, an amino acid selected from the group consisting of glycine, alanine, valine, leucine, phenylalanine, asparagine, glutamine, glutamic acid, sarcosine, taurine, lysine, methionine, cysteine, cystine, aminovaleric acid, aminoundecanoic acid, iminodiacetic acid, amino sugars and mixtures thereof in a molar ratio of (a) to (b) of from 1:0.1 to 1:10 to a temperature of at least 120° C.

7. The process as claimed in claim 6, wherein said compound of group (b) is ammonia.

* * * * *